US011049170B1

United States Patent
Francis et al.

(10) Patent No.: US 11,049,170 B1
(45) Date of Patent: Jun. 29, 2021

(54) CHECKOUT FLOWS FOR AUTONOMOUS STORES

(71) Applicant: Inokyo, Inc., San Francisco, CA (US)

(72) Inventors: Tony Francis, San Francisco, CA (US); Ryan Patrick Brigden, Menlo Park, CA (US)

(73) Assignee: Inokyo, Inc., San Francisco, CA (US)

( * ) Notice: Subject to any disclaimer, the term of this patent is extended or adjusted under 35 U.S.C. 154(b) by 9 days.

(21) Appl. No.: 16/820,671

(22) Filed: Mar. 16, 2020

Related U.S. Application Data

(63) Continuation-in-part of application No. 16/819,093, filed on Mar. 15, 2020.

(51) Int. Cl.
*G06Q 30/06* (2012.01)
*G06Q 20/20* (2012.01)
*G06T 7/292* (2017.01)
*G06T 7/70* (2017.01)
*G06F 7/14* (2006.01)

(52) U.S. Cl.
CPC ......... *G06Q 30/0633* (2013.01); *G06F 7/14* (2013.01); *G06Q 20/209* (2013.01); *G06T 7/292* (2017.01); *G06T 7/70* (2017.01); *G06T 2207/10028* (2013.01)

(58) Field of Classification Search
CPC ..... G06Q 30/0601–0643; G06Q 30/08; G06Q 30/0633; G06Q 20/209; G06T 7/292; G06T 7/70; G06T 2207/10028; G06F 7/14; H04W 4/02; H04W 4/025–029; G01C 21/206
See application file for complete search history.

(56) References Cited

U.S. PATENT DOCUMENTS

| 9,911,155 B1 * | 3/2018 | Gupta | G06Q 40/00 |
| 2013/0238451 A1 * | 9/2013 | Riscalla | G06Q 30/0643 705/15 |
| 2014/0363059 A1 * | 12/2014 | Hurewitz | G06Q 30/0201 382/118 |
| 2015/0026010 A1 * | 1/2015 | Ellison | G06Q 30/0631 705/26.41 |
| 2015/0161643 A1 * | 6/2015 | Randell | G06Q 20/0457 705/14.26 |

(Continued)

OTHER PUBLICATIONS

Caper's smart shopping cart uses AI to skip checkout lines. S. Shah. Jan. 11, 2019. https://www.engadget.com/2019-01-11-caper-smart-shopping-cart.html?ncid=txtlnkusaolp00000616 (Year: 2019).*

*Primary Examiner* — William J Allen
(74) *Attorney, Agent, or Firm* — Artegis Law Group, LLP

(57) ABSTRACT

One embodiment of the present invention sets forth a technique for detecting a first user in the autonomous store based on analysis of a first set of images collected by a set of tracking cameras in the autonomous store, creating a first virtual shopping cart for the first user without requiring the first user to establish an identity with the autonomous store, updating the first virtual shopping cart with a set of items in the autonomous store based on observations from a set of sensors of interactions between the first user and the set of items, and automatically performing at least one check-out operation related to the set of items in the first virtual shopping cart upon detecting that a first location of the first user is within proximity of a checkout location in the autonomous store.

20 Claims, 4 Drawing Sheets

(56) References Cited

U.S. PATENT DOCUMENTS

| | | | |
|---|---|---|---|
| 2016/0260145 A1* | 9/2016 | High | B62B 5/0076 |
| 2016/0299666 A1* | 10/2016 | Sakamoto | G06F 3/0488 |
| 2018/0082351 A1* | 3/2018 | Wang | G06Q 30/0633 |
| 2018/0232796 A1* | 8/2018 | Glaser | G06Q 40/12 |
| 2019/0147228 A1* | 5/2019 | Chaudhuri | G06Q 30/0201 |
| | | | 382/118 |
| 2021/0027360 A1* | 1/2021 | Shmueli | G06Q 30/0635 |

* cited by examiner

CHECKOUT FLOWS FOR AUTONOMOUS STORES

CROSS-REFERENCE TO RELATED APPLICATIONS

This application is a continuation-in-part of the co-pending U.S. patent application titled, "CHECKOUT FLOWS FOR AUTONOMOUS STORES," filed on Mar. 15, 2020 and having Ser. No. 16/819,093. The subject matter of this related application is hereby incorporated herein by reference.

BACKGROUND

Field of the Various Embodiments

Embodiments of the present disclosure relate generally to autonomous stores, and more specifically, to checkout flows for autonomous stores.

DESCRIPTION OF THE RELATED ART

Autonomous store technology allows customers to select and purchase items from stores, restaurants, supermarkets, and/or other retail establishments without requiring the customers to interact with human cashiers or staff. For example, a customer may use a mobile application to "check in" at the entrance of an unmanned convenience store before retrieving items for purchase from shelves in the convenience store. After the customer is done selecting items in the convenience store, the customer may carry out a checkout process that involves scanning the items at a self-checkout counter, linking the items to a biometric identifier for the customer (e.g., palm scan, fingerprint, facial features, etc.), and/or charging the items to the customer's account.

However, a number of challenges are encountered in the deployment, use, and adoption of autonomous store technology. First, the check-in process at many autonomous stores requires customers to register or identify themselves via a mobile application. As a result, the convenience or efficiency of the autonomous retail customer experience may be disrupted by the need to download, install, and configure the mobile application on the customers' devices before the customers are able to shop at autonomous stores. Moreover, users that do not have mobile devices may be barred from shopping at the autonomous stores. The check-in process for an autonomous store may also, or instead, be performed by customers swiping payment cards at a turnstile, which interferes with access to the autonomous store for customers who wish to browse items in the autonomous store and/or limits the rate at which customers are able to enter the autonomous store.

Second, autonomous retail solutions are associated with a significant cost and/or level of resource consumption. For example, an autonomous store commonly includes cameras that provide comprehensive coverage of the areas within the autonomous store, as well as weight sensors in shelves that hold items for purchase. Data collected by the cameras and/or weight sensors is additionally analyzed in real-time using computationally expensive machine learning and/or computer vision techniques that execute on embedded machine learning processors to track the identities and locations of customers, as well as items retrieved by the customers from the shelves. Thus, adoption and use of an autonomous retail solution by a retailer may require purchase and setup of the cameras, sensors, and sufficient computational resources to analyze the camera and sensor data in real-time.

As the foregoing illustrates, what is needed in the art are techniques for improving the computational efficiency, deployment, accuracy, and customer experience of autonomous stores.

SUMMARY

One embodiment of the present invention sets forth a technique for operating an autonomous store. The technique includes detecting a first user in the autonomous store based on analysis of a first set of images collected by a set of tracking cameras in the autonomous store, creating a first virtual shopping cart for the first user without requiring the first user to establish an identity with the autonomous store, updating the first virtual shopping cart with a set of items in the autonomous store based on interactions between the first user and the set of items captured by a set of sensors, and automatically performing at least one check-out operation related to the set of items in the first virtual shopping cart upon detecting that a first location of the first user is within proximity of a checkout location in the autonomous store.

At least one technological advantage of the disclosed technique is a streamlined user experience over conventional autonomous retail technologies that require customers to manually check in via a mobile application, radio frequency identification (RFID) tag, payment card, biometric identifier, and/or other physical indicators of the customers' identities. In turn, the lack of check-in process reduces delay and/or consumption of resources (e.g., processor, memory, storage, network, etc.) associated with developing, delivering, and/or running the mobile application and/or receiving or processing representations of the physical indicators.

Consequently, the disclosed techniques provide technological improvements in computer systems, applications, and/or techniques for deploying, adopting, or executing autonomous stores.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
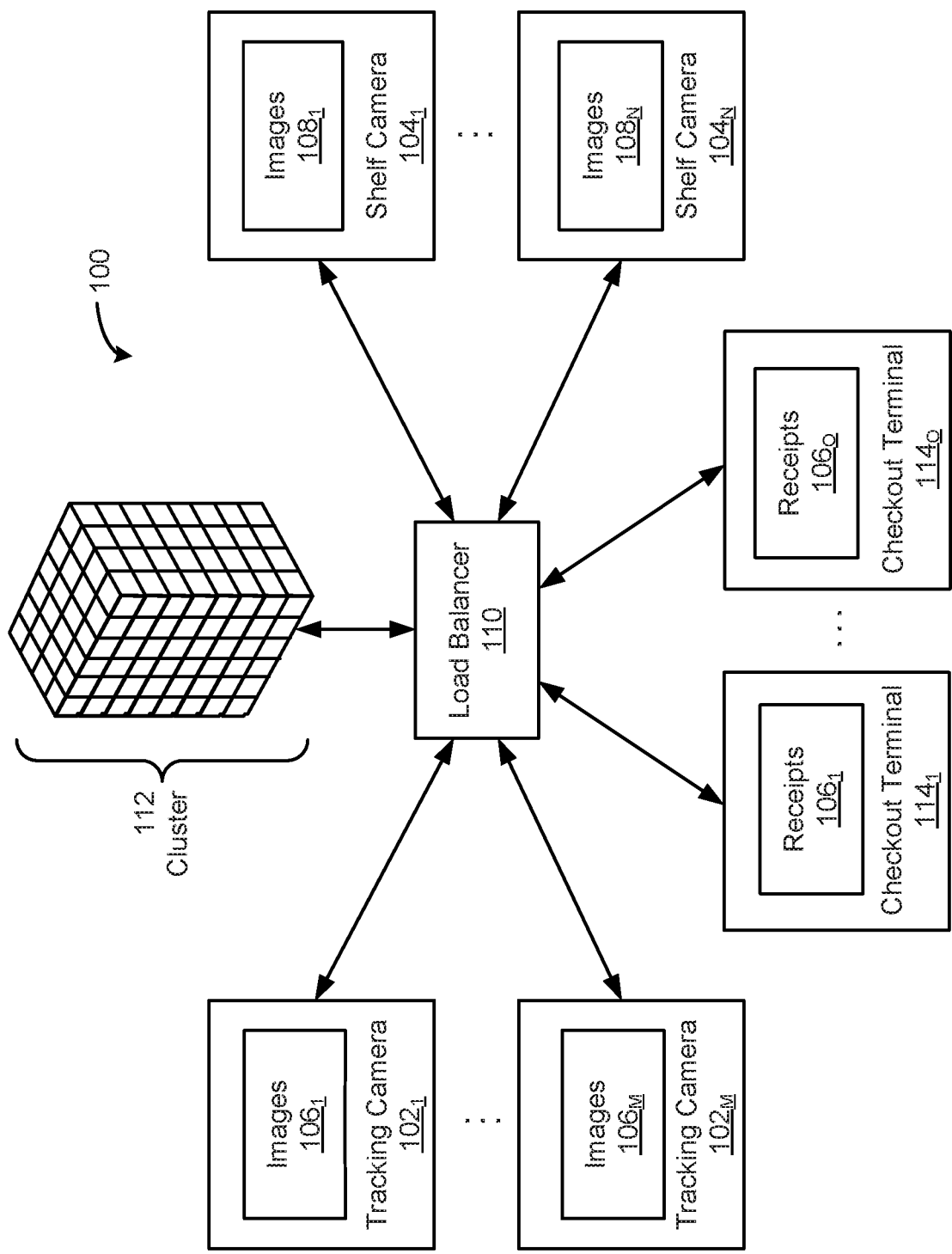
FIG. 1 illustrates a system configured to implement one or more aspects of various embodiments.

FIG. 1 illustrates a system 100 configured to implement one or more aspects of the present disclosure. In one or more embodiments, system 100 operates an autonomous store that processes purchases of items in a physical storefront. Within the autonomous store, users that are customers are able to retrieve and purchase the items without requiring the users to interact with human cashiers or staff.

As shown, system 100 includes, without limitation, a number of tracking cameras $102_{1-M}$, a number of shelf cameras $104_{1-N}$, and a number of checkout terminals $114_{1-O}$. Tracking cameras $102_{1-M}$, shelf cameras $104_{1-N}$, and checkout terminals $114_{1-O}$ are connected to a load balancer 110, which distributes processing related to tracking cameras $102_{1-M}$, shelf cameras $104_{1-N}$, and checkout terminals $114_{1-O}$ among a number of nodes in a cluster 112. For example, tracking cameras $102_{1-M}$, shelf cameras $104_{1-N}$, and checkout terminals $114_{1-O}$ may send and/or receive data over a wired and/or wireless network connection with load balancer 110. In turn, load balancer 110 may distribute workloads related to the data across a set of physical and/or virtual machines in cluster 112 to optimize resource usage in cluster 112, maximize throughput related to the workloads, and/or avoid overloading any single resource in cluster 112.

Tracking cameras $102_{1-M}$ capture images $106_{1-M}$ of various locations inside the autonomous store. These images $106_{1-M}$ are analyzed by nodes in cluster 112 to uniquely identify and locate users in the autonomous store. For example, tracking cameras $102_{1-M}$ include stereo depth cameras that are positioned within and/or around the autonomous store. The stereo depth cameras capture overlapping views of the front room area of the autonomous store that is accessible to customers. In addition, each stereo depth camera senses and/or calculates depth data that indicates the distances of objects or surfaces in the corresponding view from the camera. Nodes in cluster 112 receive images $106_{1-M}$ and depth data from tracking cameras $102_{1-M}$ via load balancer 110 and analyze the received information to generate unique "descriptors" of the customers based on the representations of the customers in images $106_{1-M}$ and depth data. These descriptors are optionally combined with "tracklets" representing short paths of the customers' trajectories in the autonomous store to estimate the customers' locations within the camera views as the customers move around the autonomous store.

Shelf cameras $104_{1-N}$ capture images $108_{1-N}$ of interactions between customers and items on shelves of the autonomous store. These images $108_{1-N}$ are analyzed by nodes in cluster 112 to identify interactions between the customers and items offered for purchase on shelves of the autonomous store. For example, shelf cameras $104_{1-N}$ may be positioned above or along shelves of the autonomous store to monitor locations in the vicinity of the shelves. Like tracking cameras $102_{1-M}$, shelf cameras $104_{1-N}$ may include stereo depth cameras that collect both visual and depth information from the shelves and corresponding items. Images $108_{1-N}$ and depth data from shelf cameras $104_{1-N}$ are received by cluster 112 via load balancer 110 and analyzed to detect actions like removal of an item from a shelf and/or placement of an item onto a shelf. In turn, the actions are associated with customers based on the customers' tracked locations and/or identities and used to update virtual shopping carts for the customers, as described in further detail below.

In various embodiments, checkout terminals $114_{1-O}$ are located near one or more exits of the autonomous store. Each checkout terminal includes hardware, software, and/or functionality to perform a checkout process with a customer before the customer leaves the autonomous store. For example, the checkout process may be automatically triggered for a customer when the customer's tracked location indicates that the customer has approached the checkout terminal.

During the checkout process, the checkout terminal and/or a mobile application on the customer's device display the customer's virtual shopping cart and process payment for the items in the virtual shopping cart. The checkout terminal and/or mobile application additionally output a receipt (e.g., receipts $114_{1-O}$) to the customer. For example, the checkout terminal displays the receipt in a screen to the customer to confirm that the checkout process is complete, which allows the customer to leave the autonomous store with the purchased items. In other words, the checkout process includes steps or operations for finalizing the customer's purchase of items in his/her virtual shopping cart.

In some embodiments, the checkout process processes payment after the customer leaves the autonomous store. For example, the checkout terminal and/or mobile application may require proof of payment (e.g., a payment card number) before the customer leaves with items taken from the autonomous store. The payment may be performed after the customer has had a chance to review, approve, and/or dispute the items in the receipt.

In some embodiments, the checkout process is performed without requiring display of the receipt in a physical checkout terminal in the autonomous store. For example, a mobile application that stores payment information for the customer and/or the mobile device on which the mobile application is installed may be used to initiate the checkout process via a non-physical localization method such as Bluetooth (Bluetooth™ is a registered trademark of Bluetooth SIG, Inc.), near-field communication (NFC), WiFi (WiFi™ is a registered trademark of WiFi Alliance), and/or a non-screen-based contact point. Once the checkout process is initiated, payment information for the customer from the mobile application is linked to items in the customer's virtual shopping cart, and the customer is allowed to exit the autonomous store without reviewing the items and/or manually approving the payment.

In some embodiments, system 100 is deployed and/or physically located on the premises of the autonomous store to reduce expedite the collection and processing of data required to operate the autonomous store. For example, load balancer 110 and machines in cluster 112 may be located in proximity to tracking cameras $102_{1-M}$, shelf cameras $104_{1-N}$, and checkout terminals $114_{1-O}$ (e.g., in a back room or server room of the autonomous store that is not accessible to customers) and connected to tracking cameras $102_{1-M}$, shelf cameras $104_{1-N}$, and checkout terminals $114_{1-O}$ via a fast local area network (LAN). In addition, the size of cluster 112 may be selected to scale with the number of tracking cameras $102_{1-M}$, shelf cameras $104_{1-N}$, checkout terminals $114_{1-O}$, items, and/or customers in the autonomous store. Consequently, system 100 may support real-time tracking of customers and the customers' shelf interactions via analysis of images $106_{1-M}$ and $108_{1-N}$, updating of the customers' virtual shopping carts based on the tracked locations and interactions, and execution of checkout processes for the customers before the customers leave the autonomous store.

Figure 2:
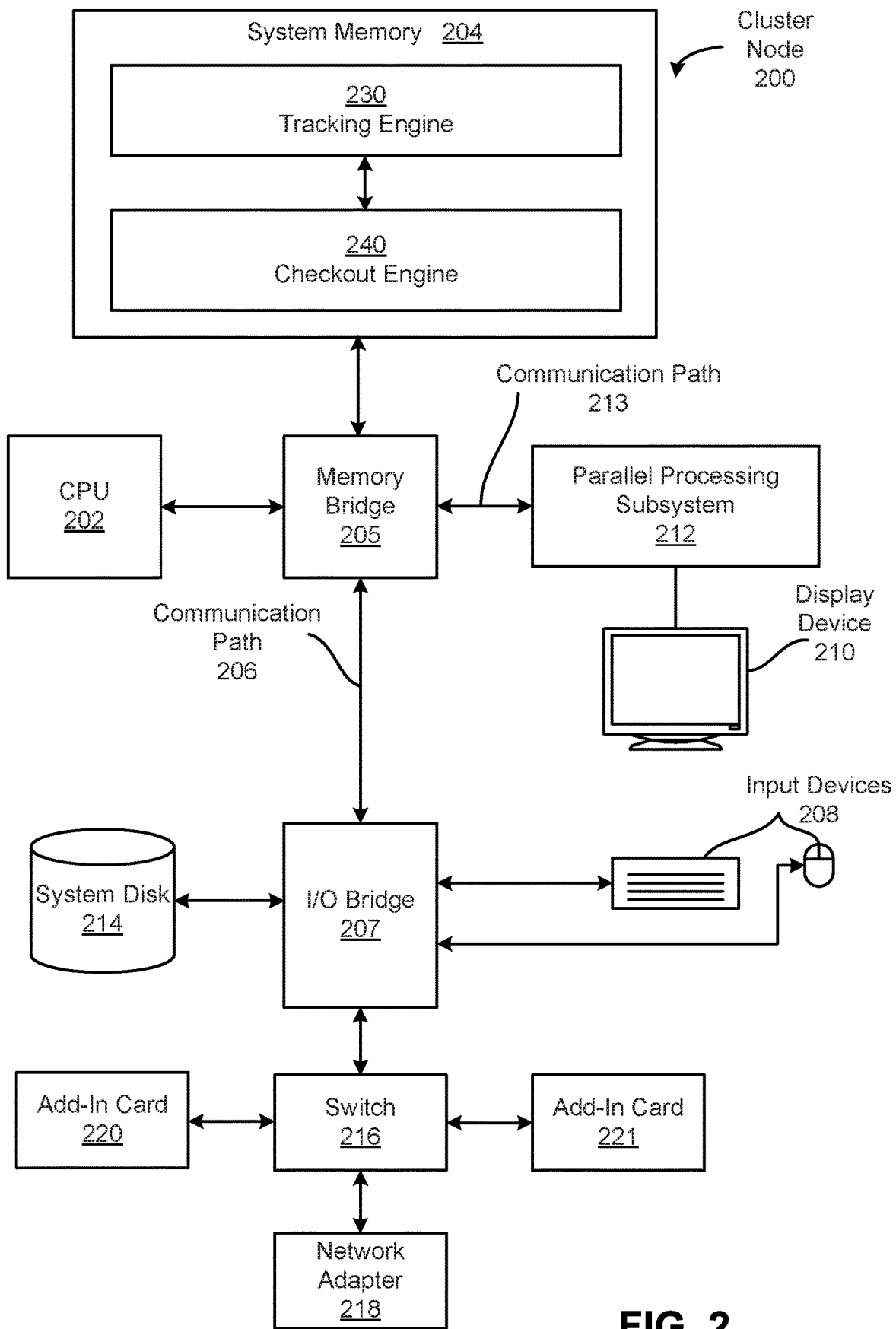
FIG. 2 is a more detailed illustration of a cluster node in the cluster of FIG. 1, according to various embodiments.

FIG. 2 is a more detailed illustration of a cluster node 200 in cluster 112 of FIG. 1, according to various embodiments. In one or more embodiments, cluster node 200 includes a computer configured to perform processing related to operating an autonomous store. Cluster node 200 may be replicated in additional computers within cluster 112 to scale with the workload involved in operating the autonomous store. Some or all components of cluster node 200 may also, or instead, be implemented in checkout terminals (e.g., checkout terminals $114_{1-O}$ of FIG. 1) and/or other components of a system (e.g., system 100 of FIG. 1) that operates the autonomous store.

As shown, cluster node 200 includes, without limitation, a central processing unit (CPU) 202 and a system memory 204 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In operation, I/O bridge 207 is configured to receive user input information from input devices 208, such as a keyboard or a mouse, and forward the input information to CPU 202 for processing via communication path 206 and memory bridge 205. Switch 216 is configured to provide connections between I/O bridge 207 and other components of cluster node 200, such as a network adapter 218 and various add-in cards 220 and 221.

I/O bridge 207 is coupled to a system disk 214 that may be configured to store content, applications, and data for use by CPU 202 and parallel processing subsystem 212. As a general matter, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 207 as well.

In various embodiments, memory bridge 205 may be a Northbridge chip, and I/O bridge 207 may be a Southbridge chip. In addition, communication paths 206 and 213, as well as other communication paths within cluster node 200, may be implemented using any technically suitable protocols, including, without limitation, AGP (Accelerated Graphics Port), HyperTransport, or any other bus or point-to-point communication protocol known in the art.

In some embodiments, parallel processing subsystem 212 includes a graphics subsystem that delivers pixels to a display device 210, which may be any conventional cathode ray tube, liquid crystal display, light-emitting diode display, or the like. In such embodiments, parallel processing subsystem 212 incorporates circuitry optimized for graphics and video processing, including, for example, video output circuitry. Such circuitry may be incorporated across one or more parallel processing units (PPUs) included within parallel processing subsystem 212. In other embodiments, parallel processing subsystem 212 incorporates circuitry optimized for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and compute processing operations. System memory 204 includes at least one device driver configured to manage the processing operations of the one or more PPUs within parallel processing subsystem 212.

In various embodiments, parallel processing subsystem 212 may be integrated with one or more of the other elements of FIG. 2 to form a single system. For example, parallel processing subsystem 212 may be integrated with CPU 202 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, system memory 204 could be connected to CPU 202 directly rather than through memory bridge 205, and other devices would communicate with system memory 204 via memory bridge 205 and CPU 202. In other alternative topologies, parallel processing subsystem 212 may be connected to I/O bridge 207 or directly to CPU 202, rather than to memory bridge 205. In still other embodiments, I/O bridge 207 and memory bridge 205 may be integrated into a single chip instead of existing as one or more discrete devices. Lastly, in certain embodiments, one or more components shown in FIG. 2 may not be present. For example, switch 216 could be eliminated, and network adapter 218 and add-in cards 220, 221 would connect directly to I/O bridge 207. In another example, display device 210 and/or input devices 208 may be omitted for some or all computers in cluster 112.

In some embodiments, cluster node 200 is configured to run a tracking engine 230 and a checkout engine 240 that reside in system memory 204. Tracking engine 230 and checkout engine 240 may be stored in system disk 214 and/or other storage and loaded into system memory 204 when executed.

More specifically, tracking engine 230 includes functionality to track users and/or the users' interactions with items in an autonomous store, and checkout engine 240 include functionality to perform a checkout process that finalizes the users' purchase of the items. As described in further detail below, tracking engine 230 and checkout engine 240 provide a user experience that reduces the amount of interaction, delay, and/or processing required to process purchases of items from the autonomous store by the users.

Checkout Flows for Autonomous Stores

Figure 3:
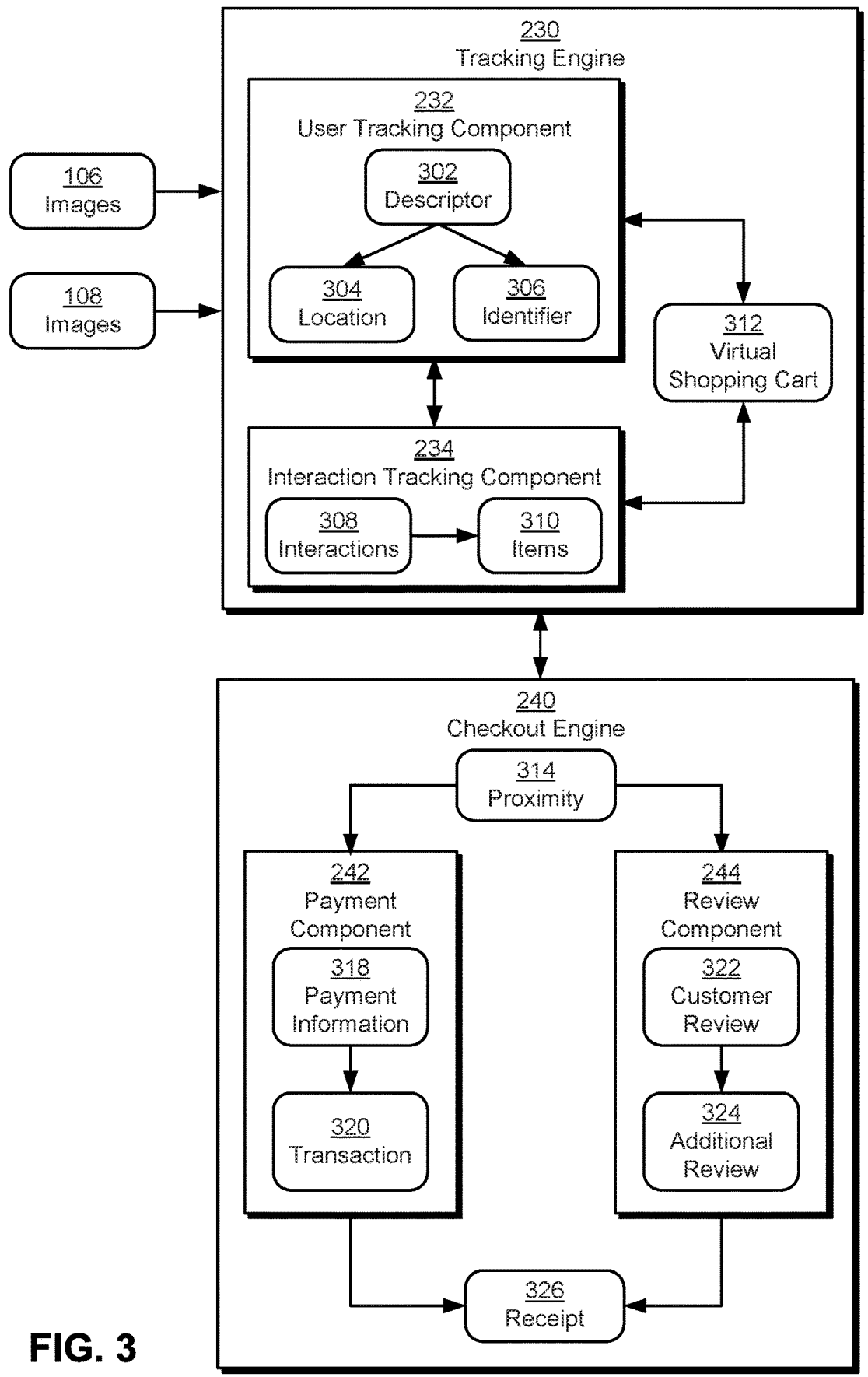
FIG. 3 is a more detailed illustration of the tracking engine and checkout engine of FIG. 2, according to various embodiments.

FIG. 3 is a more detailed illustration of tracking engine 230 and checkout engine 240 of FIG. 2, according to various embodiments. As shown, tracking engine 230 includes a user tracking component 232 and an interaction tracking component 234, and checkout engine 240 includes a payment component 242 and a review component 244. Each of these components is described in further detail below.

In general, tracking engine 230 analyzes images 106 collected by tracking cameras (e.g., tracking cameras $102_{1-M}$ of FIG. 1) and images 108 collected by shelf cameras (e.g., shelf cameras $104_{1-N}$ of FIG. 1) in the autonomous store to track each user and the user's actions in an autonomous store. Within tracking engine 230, user tracking component 232 analyzes images 106 and/or depth data from the tracking cameras to determine the number of unique users, as well as the locations of the users, within the autonomous store.

In some embodiments, user tracking component 232 uses human pose estimation techniques to detect users in images 106 and generates crops of pixels in images 106 that contain the users. Next, user tracking component 232 applies an embedding model to the crops to generate, for each user, a descriptor 302 that is a fixed-length vector representation of the user's appearance (e.g., visual appearance, depth information, etc.) in images 106. Because the embedding model is trained to distinguish between the appearances of different users, vector representations outputted by the embedding models for crops of the same user are closer to one another in a vector space than vector representations outputted by the embedding model for crops of different users. Thus, user tracking component 232 may detect the presence of a new user in the autonomous store (e.g., after the user walks into the autonomous store) when the embedding model produces, from crops of the new user, a descriptor that is greater than a threshold distance in the vector space from descriptors of existing users in the autonomous store. After descriptor 302 is created for a given user, user tracking component 232 is able to use descriptor 302 to identify the user in other images 106, including images 106 from potentially non-overlapping camera views.

When a new user is detected, user tracking component 232 assigns a unique identifier 306 to the user's descriptor 302 and creates a virtual shopping cart 312 that is mapped to identifier 306 and/or descriptor 302. For example, user tracking component 232 instantiates one or more data structures or objects representing virtual shopping cart 312 and stores identifier 306 and/or descriptor 302 in fields within the data structure(s) and/or object(s).

As each user moves around in the autonomous store, user tracking component 232 continues analyzing images 106 to track the user's location 304 within the autonomous store. For example, user tracking component 232 matches crops of the user in images 106 to descriptor 302 and estimates the user's location 304 based on the tracking cameras from which the crops were taken. User tracking component 232 optionally refines the user's location 304 using "tracklets" that model paths traversed by the customers over short periods of time (e.g., a certain number of camera frames).

In one or more embodiments, user tracking component 232 represents each user's location 304 as a tracklet containing a set of key points representing the user's pose over a short time period in a single camera view. User tracking component 232 also uses geometric constraints between the camera view and overlapping camera views to update location 304 based on other crops and tracklets of the user. In other words, location 304 does not require calculation of the user's position with respect to a global reference frame. Instead, location 304 may include, for each key point in the user's pose from the single camera view, a set of possible locations of the key point in the overlapping camera views, which may be represented as an epipolar line in each overlapping camera view.

Consequently, user tracking component 232 is capable of uniquely identifying and locating each user based on the user's appearance and short-term movement in images 106. In turn, the autonomous store may allow the users to begin shopping without requiring the users to manually establish identities for themselves during a check-in process with the autonomous store (e.g., by opening or scanning a mobile application installed on the users' mobile devices).

Interaction tracking component 234 analyze images 108 and/or depth data from shelf cameras (e.g., shelf cameras $102_{1-N}$ of FIG. 1) in the autonomous store to track interactions 308 between the each user and a set of items 310. In one or more embodiments, interactions 308 include "shelf affecting" interactions representing actions by the users that affect the contents of the shelves in the autonomous store. These shelf affecting interactions include, but are not limited to, a user picking up an item from a shelf and/or placing an item onto the shelf.

To detect a shelf affecting interaction, interaction tracking component 234 tracks the locations and/or poses of users and the users' hands in images 108. When a hand performs a movement that matches the trajectory or other visual attributes of a shelf affecting interaction, interaction tracking component 234 associates the interaction with a user previously identified by user tracking component 232. For example, interaction tracking component 234 may associate the hand's location with the user to which the hand is closest over a period (e.g., a number of seconds) before, during, and/or after the interaction. Interaction tracking component 234 may match the user's crops, key points, and/or tracklets in images 108 of the interaction from a shelf camera to additional images 106 of the user and/or interaction from one or more tracking cameras with views that overlap with those of the shelf camera. Because the tracking cameras have a better perspective of the user's appearance than the shelf camera, interaction tracking component 234 may then identify the user using descriptor 302 generated from crops of the user in the tracking camera views.

Next, interaction tracking component 234 classifies the item to which the user's interaction is applied. For example, interaction tracking component 234 may input crops of images that capture the interaction (e.g., crops that include the user's hand and at least a portion of the item) into one or more machine learning models, and the machine learning model(s) may generate output for classifying the item. The output includes, but is not limited to, predicted probabilities that various item classes representing distinct stock keeping units (SKUs) and/or categories of items (e.g., baked goods, snacks, produce, drinks, etc. in a grocery store) are present in the crops. If a given item class includes multiple predicted probabilities (e.g., from multiple machine learning models and/or by a machine learning model from multiple crops of the interaction), interaction tracking component 234 may combine the predicted probabilities (e.g., as an average, weighted average, etc.) into an overall predicted probability for the item class. Interaction tracking component 234 then identifies the item in the interaction as the item class with the highest overall predicted probability of appearing in the crops.

Interaction tracking component 234 then updates the user's virtual shopping cart 312 to reflect the user's interaction with the identified item. More specifically, interaction tracking component 234 adds the item to virtual shopping cart 312 when the interaction is identified as removal of the item from a shelf. Conversely, interaction tracking component 234 removes the item from the user's virtual shopping cart when the interaction is identified as placement of the item onto a shelf. Thus, as the user browses or shops in the autonomous store, user tracking component 232 may update the user's location 304 (e.g., as crops, key points, and/or tracklets in camera views in which the user appears), and interaction tracking component 234 may update virtual shopping cart 312 based on the user's interactions 308 with items 310 in the autonomous store.

In some embodiments, checkout engine 240 monitors the user's location 304 for proximity 314 to a checkout location and/or checkout terminal (e.g., checkout terminals $114_{1-O}$ of FIG. 1) in the autonomous store. When location 304 indicates that the user is approaching or is within a threshold proximity 314 to a given checkout terminal (e.g., based on one or more camera views of the checkout terminal), checkout engine 240 initiates a checkout process that finalizes the user's purchase of items 310 in the user's virtual shopping cart 312. Checkout engine 240 optionally verifies additional criteria related to the user's location 304 and/or behavior (e.g., proximity 314 is maintained for a certain number of seconds, the user faces the checkout terminal, the user interacts with a user interface on the checkout terminal, etc.) before initiating the checkout process.

Checkout engine 240 additionally includes functionality to adapt the checkout process to multiple users in the same group. For example, checkout engine 240 may determine that two or more users belong to a group that is checking out together when the users approach a checkout terminal together, which can be detected as the users maintaining a similar trajectory and/or threshold proximity to one another for a pre-specified period immediately before reaching the checkout terminal. When such a group of users is detected, checkout engine 240 may merge individual virtual shopping carts of the users into a single virtual shopping cart 312 and conduct the checkout process using the single virtual shopping cart 312.

During the checkout process, a payment component 242 in checkout engine 240 receives payment information 318 for items 310 in the user's virtual shopping cart 312. For example, payment component 242 may receive payment information 318 from a mobile application that resides on the user's electronic device and is activated by the user before or during the checkout process. The mobile application may include, but is not limited to, a mobile payment service, an application that supports shopping at the autonomous store, and/or another type of application. Payment component 242 may also, or instead, receive payment information 318 as attributes of a payment card (e.g., card number, expiration date, cardholder name, security code, etc.) after the user taps, swipes, inserts, or otherwise provides the payment card to a card reader at the checkout terminal.

After payment information 318 is received, payment component 242 may perform an electronic transaction 320 that triggers payment for the items using the provided payment information 318. For example, payment component 242 may communicate with a payment processor, acquiring bank, card network, and/or payment system to carry out transaction 320.

Payment component 242 additionally displays a receipt 326 for the payment in a screen on the checkout terminal and/or the user's mobile device. Payment component 242 also, or instead, prints a copy of receipt 326 using a printer in the checkout terminal. After receipt 326 is printed, displayed, or otherwise outputted to the user, the checkout process is complete. In various embodiments, any data related to an identity of a given user is destroyed once the checkout process is complete.

In some embodiments, checkout engine 240 additionally includes a review component 244 that initiates or carries out a review of items 310 in the user's virtual shopping cart 312. This review may be performed before, during, or after the checkout process.

As shown, review of items 310 in virtual shopping cart 312 may include a customer review 322 that involves the user reviewing the contents of virtual shopping cart 312. For example, review component 244 performs customer review 322 by displaying a list of items 310 in virtual shopping cart 312 to the user (e.g., via a screen on the checkout terminal and/or the mobile application on the user's mobile device). Review component 244 also prompts the user for verification that all items 310 in the list are correct. If the user confirms that items 310 in the list are correct, review component 244 may complete the review process.

If, during customer review 322, the user wishes to dispute one or more items 310 in virtual shopping cart 312 (e.g., when the user identifies an item in the virtual shopping cart that the user has not taken), the user may request additional review 324 of the disputed item(s). Continuing with the above example, the user may select, in the displayed list of items 310, one or more items 310 that the user considers to be incorrectly added to virtual shopping cart 312. The user may then submit the selected item(s) for additional review 324 by selecting a "request review" button or user-interface element provided by the mobile application and/or checkout terminal.

Additional review 324 in the review process may also, or instead, be triggered for an item in virtual shopping cart 312 when interaction tracking component 234 classifies the item with low confidence before the checkout process is initiated. For example, when an item is added to virtual shopping cart 312, interaction tracking component 234 may apply a threshold (e.g., numeric threshold, percentile threshold, etc.) to the overall predicted probability associated with the item's class. If the predicted probability falls below the threshold, interaction tracking component 234 flags the item for additional review 324.

Once additional review 324 is initiated (e.g., during customer review 322 and/or by interaction tracking component 234), review component 244 transmits available images (e.g., images 106 and/or images 108) of one or more interactions 308 involved in the review, probabilities of item classes associated with the interaction(s), and/or the types of the interactions identified by interaction tracking component 234 (e.g., removing an item from a shelf, placing an item onto a shelf, etc.) over a network to a human reviewer. The human reviewer examines the images and generates feedback that confirms or rejects the predicted item classes and/or corresponding types of interactions. If a given item or type of interaction is rejected, the human reviewer may provide a correction to the item or interaction. For example, the human reviewer may change the class of item targeted by an interaction from a first SKU to a second SKU and/or the type of the interaction from "retrieving an item" to "replacing an item." The human reviewer also has the option of specifying an "unknown" value for the item class or type of interaction if the human reviewer cannot discern the corresponding attribute from the images.

After the human reviewer has submitted the feedback, the item class or interaction type specified by the human reviewer is applied to virtual shopping cart 312. For example, review component 244 may remove an item from virtual shopping cart 312 after the human reviewer specifies that the user has replaced the item onto a shelf in the autonomous store. In another example, review component 244 may perform a default action related to an item under review (e.g., removing the item from virtual shopping cart 312) if the human reviewer specifies an "unknown" value for the item's class and/or the interaction applied to the item.

In some embodiments, human reviewers may be unavailable to provide feedback on an item and/or interaction flagged for additional review 324 in a timely manner (e.g., within a number of seconds after the checkout process is initiated). To prevent further delay in the user's experience with the autonomous store, the item is temporarily removed from the user's virtual shopping cart 312, and the checkout process proceeds with the user purchasing the remaining items 310 in virtual shopping cart 312. After a human reviewer has provided feedback on the item and/or interaction, transaction 320 is updated to reflect the feedback, and the user is optionally notified of the result of the review.

For example, if the human reviewer confirms that the item was taken by the user, the item and/or corresponding price are added to transaction 320, and the user is optionally sent a notification and/or updated receipt 326 that includes the added item. In another example, if the human reviewer confirms that the item was not taken by the user, the item is permanently removed from virtual shopping cart 312, and transaction 320 is not modified. In a third example, if the human reviewer confirms that a different item was taken by the user, transaction 320 is modified to include the item identified by the human reviewer, and the user is optionally sent a notification and/or updated receipt 326 that includes the added item.

When the user notices an item missing from virtual shopping cart 312 that the user has taken from a shelf for purchase, the user may indicate the lack of the item in virtual shopping cart 312 during customer review 322. In turn, a human reviewer may perform additional review 324 of relevant images and/or data related to the item, and virtual shopping cart 312 and/or the transaction for purchasing items 310 in virtual shopping cart 312 may be updated to reflect the human reviewer's feedback. Alternatively or additionally, the user may manually add the item to virtual shopping cart 312 by holding (or otherwise showing) the item in front of a camera in the checkout terminal, and interaction tracking component 234 and/or another component of the system may classify the item based on images collected by the camera. The classified item may then be added to the user's virtual shopping cart 312, and the checkout process may proceed with the added item.

In some embodiments, checkout engine 240 omits the checkout process for a user when the user's virtual shopping cart 312 is empty. As a result, the user is not required to approach a checkout terminal and can exit the autonomous store without interacting with payment component 242 or review component 244.

Figure 4:
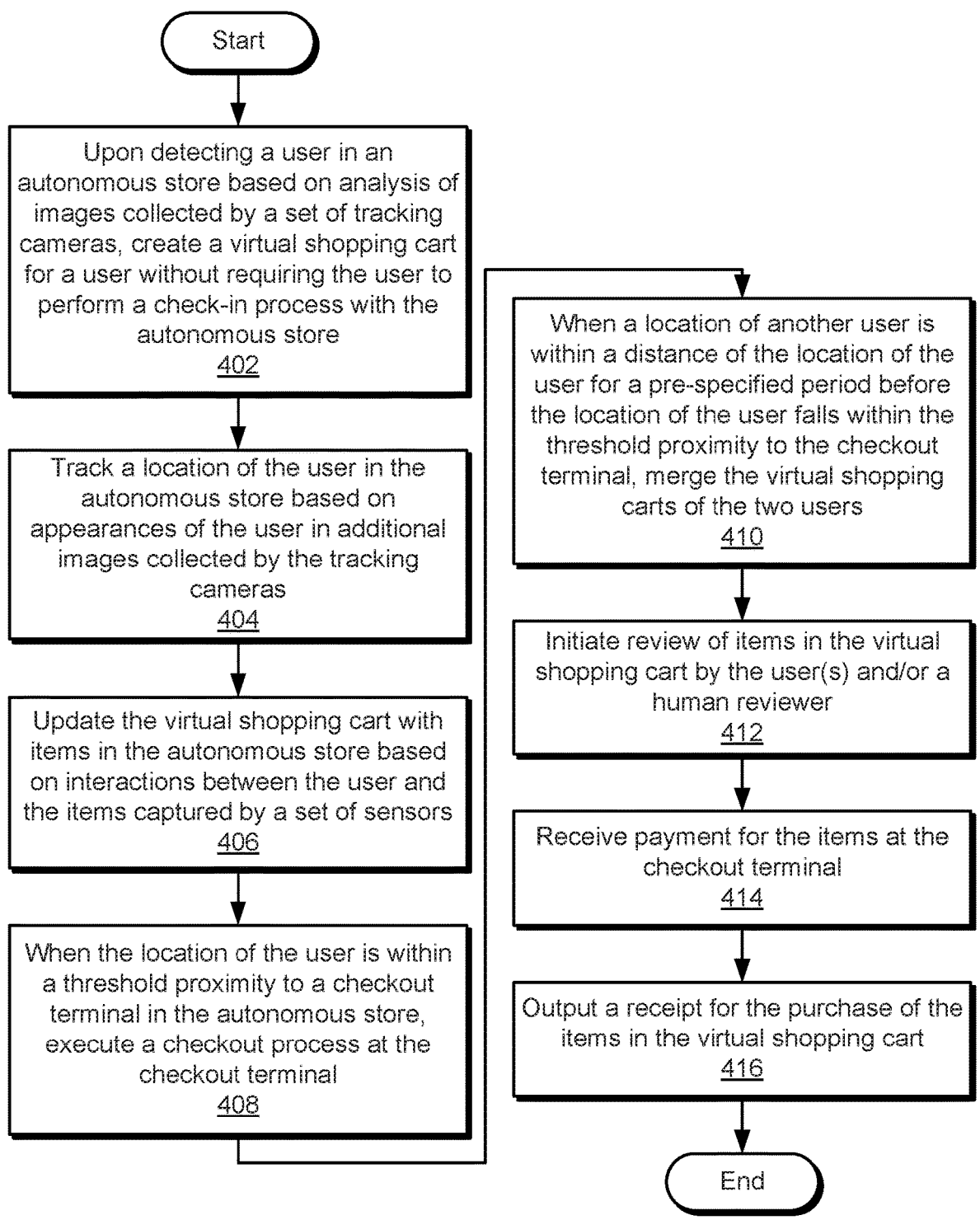
FIG. 4 is a flow chart of method steps for operating an autonomous store, according to various embodiments.

FIG. 4 is a flow chart of method steps for operating an autonomous store, according to various embodiments. Although the method steps are described in conjunction with the systems of FIGS. 1-3, persons skilled in the art will understand that any system configured to perform the method steps, in any order, is within the scope of the present invention.

As shown, upon detecting a user in the autonomous store based on analysis of images collected by a set of tracking cameras, tracking engine 230 creates 402 a virtual shopping cart for the user without requiring the user to perform a check-in process with the autonomous store. For example, tracking engine 230 may detect the user in the autonomous store by generating a descriptor from crops of the user in the images and determining that the descriptor does not match any descriptors for other users in the autonomous store. After the user is detected, tracking engine 230 may assign a unique identifier to the descriptor and associate the virtual shopping cart with the unique identifier. Thus, tracking engine 230 uses the descriptor, unique identifier, and virtual shopping cart as a representation of the user's identity and activity within the autonomous store instead of establishing the user's identity from credentials (e.g., a mobile application) manually provided by the user to the autonomous store.

Next, tracking engine 230 tracks 404 a location of the user in the autonomous store based on appearances of the user in additional images collected by the tracking cameras. For example, tracking engine 230 may continue detecting the user in images from the tracking cameras by matching crops of the user to the user's descriptor. Tracking engine 230 may also update the user's location by identifying the tracking cameras from which the crops were obtained and/or generating tracklets of the user's motion in the images.

Tracking engine 230 updates 406 the virtual shopping cart with items in the autonomous store based on observations from a set of sensors of interactions between the user and the items. For example, the sensors include a set of shelf cameras, a set of weight sensors, and/or other types of sensors that capture or record the user's interactions with items on shelves in the autonomous store. The interactions may be analyzed to identify sequences of actions performed by a hand of the user and items to which the actions are applied. When an interaction involves the user retrieving an item from a shelf, the item is added to the user's virtual shopping cart. When an interaction involves the user placing an item onto a shelf, the item is removed from the virtual shopping cart.

When the location of the user is within proximity to a checkout terminal and/or checkout location in the autonomous store, checkout engine 240 executes 408 a checkout process. For example, checkout engine 240 initiates the checkout process when the user has approached the checkout terminal, has remained at the checkout terminal for a certain period, is facing the checkout terminal, and/or is interacting with the user interface of the checkout terminal. In another example, checkout engine 240 initiates the checkout process when the user has entered a "checkout region" in the autonomous store (e.g., an area next to an exit of the autonomous store) and/or initiated the checkout process via a mobile application and a non-physical localization method such as Bluetooth, WiFi localization, and/or NFC.

When a location of another user is within a distance of the user's location for a pre-specified period before the location of the user falls within the threshold proximity to the checkout terminal and/or checkout location, checkout engine 240 merges 410 the virtual shopping carts of the two users. For example, checkout engine 240 may detect that the two users are approaching the checkout terminal together when the users remain within a certain number of feet of one another and/or maintain substantially the same trajectory while moving toward the checkout terminal. Because the users are identified as belonging to the same group, the users' virtual shopping carts are merged into a single shopping cart to allow the checkout process to be performed by one of the users. The checkout terminal may optionally prompt the users for confirmation to merge their virtual shopping carts prior to combining the users' shopping carts into the single shopping cart.

During the checkout process, checkout engine 240 initiates 412 review of items in the virtual shopping cart by the user(s) and/or a human reviewer. For example, checkout engine 240 and/or the checkout terminal may output a list of items in the virtual shopping cart to the user and prompt the user to review the list for correctness. If the user disputes an item in the virtual shopping cart and/or the class of an item in the virtual shopping cart is predicted with low confidence, checkout engine 240 may initiate review of the item by a human reviewer. Checkout engine 240 may then update the virtual shopping cart in accordance with feedback by the user and/or human reviewer.

Checkout engine 240 also receives 414 payment for the items at the checkout terminal. For example, checkout engine 240 may receive payment information from a mobile application on a user's electronic device and/or a payment card scanned at the checkout terminal. Checkout engine 240 may then perform an electronic transaction that involves a purchase of the items using the payment information. This electronic transaction is optionally performed after the customer has left the autonomous store (e.g., using payment information obtained during operation 414).

Finally, checkout engine 240 outputs 416 a receipt for the purchase of the items in the virtual shopping cart. For example, checkout engine 240 displays the receipt within the user's mobile application and/or at the checkout terminal.

In some embodiments, checkout engine 240 performs operation 416 at the beginning of the checkout process. In these embodiments, checkout engine 240 triggers output of the receipt based on the user's proximity to the checkout terminal instead of explicit input from the user (e.g., the user interacting with the checkout terminal). After the receipt is outputted, checkout engine 240 may perform operation 412 to allow the user to dispute any items in the receipt. Alternatively, checkout engine 240 may omit operation 412 during the checkout process to reduce the number of steps involved in the checkout process. Instead, checkout engine 240 and/or another component may provide the user an option to review and/or dispute any items in the receipt after the checkout process is complete (e.g., after the user has left the autonomous store). After the user's review of the receipt is complete, checkout engine 240 may process payment for the items by the user (e.g., using payment information obtained during operation 414). Alternatively, if the user's payment for the items was processed before the review was completed, checkout engine 240 may modify the transaction performed to charge the user for the items to reflect any changes made during the review. In other words, checkout engine 240 may omit and/or reorder operations 412-416 and/or other checkout operations in the checkout process to accommodate various goals related to the checkout process (e.g., ease of use, speed, accuracy of items in the virtual shopping cart, presence or absence of checkout terminal, etc.).

In some embodiments, checkout engine 240 omits operations 408-416 when the user's virtual shopping cart is empty. As a result, the user may leave the autonomous store without approaching a checkout terminal, reviewing items in the virtual shopping cart, or providing payment information to the autonomous store.

In sum, the disclosed embodiments provide a user experience in an autonomous store. The user experience includes entering and perusing items in the autonomous store without first registering or checking in with the autonomous store. While a user is in the autonomous store, images from cameras are analyzed to track the user's locations and interactions with items on the shelves of the autonomous store. The interactions are used to automatically add items to and/or remove items from the user's virtual shopping cart. Finally, the user's proximity to a checkout terminal in the autonomous store is used to automatically trigger a checkout process that concludes with outputting a receipt confirming the user's purchase of the items in the virtual shopping cart before the user leaves the autonomous store.

By omitting a user check-in process, the autonomous store streamlines the user experience over conventional autonomous retail technologies that require users to manually check in via a mobile application, radio frequency identification (RFID) tag, payment card, biometric identifier, and/or another indicator of the users' identities. The lack of check-in process reduces delay and/or consumption of resources (e.g., processor, memory, storage, network, etc.) associated with developing, delivering, and/or running the mobile application and/or processing the manual check-ins.

The autonomous store also, or instead, produces a receipt for each customer's purchase before the customer leaves the autonomous store, which allows processing of purchases to be finalized more quickly than conventional autonomous stores that send receipts to customers after the customers leave with the purchased items. Consequently, the disclosed techniques provide technological improvements in computer systems, applications, and/or techniques for deploying, adopting, or executing autonomous stores.

1. In some embodiments, a method comprises detecting a first user in a store based on analysis of a first set of images collected by a set of tracking cameras in the store; creating a first virtual shopping cart for the first user without requiring the first user to establish an identity with the store; updating the first virtual shopping cart with a set of items in the store based on observations from a set of sensors of interactions between the first user and the set of items; and automatically performing at least one check-out operation related to the set of items in the first virtual shopping cart upon detecting that a first location of the first user is within proximity of a checkout location in the store.

2. The method of clause 1, wherein automatically performing at least one check-out operation comprises outputting a receipt for a purchase of the set of items in the first virtual shopping cart.

3. The method of any of clauses 1-2, further comprising when a second location of a second user is within a threshold distance to the first location of the first user for a pre-specified period, merging a second virtual shopping cart for the second user into the first virtual shopping cart.

4. The method of any of clauses 1-3, wherein automatically performing at least one check-out operation comprises receiving payment from the first user for the set of items at a checkout terminal at the checkout location.

5. The method of any of clauses 1-4, wherein the payment is received via at least one of a mobile application on an electronic device and a payment card scanned at a checkout terminal at the checkout location.

6. The method of any of clauses 1-5, wherein automatically performing at least one check-out operation comprises initiating a review of an item in the first virtual shopping cart by at least one of the first user and a human reviewer.

7. The method of any of clauses 1-6, wherein the review of the item by the human reviewer is triggered based on at least one of a low confidence in an item in the first virtual shopping cart and input from the first user for disputing the item in the first virtual shopping cart.

8. The method of any of clauses 1-7, wherein creating the first virtual shopping cart for the first user comprises generating a descriptor for the first user from crops of the first user in the first set of images; assigning a unique identifier (UID) to the descriptor; and associating the first virtual shopping cart with the UID.

9. The method of any of clauses 1-8, wherein the interactions comprise an action performed by a hand of the first user with respect to an item to which the action is applied.

10. The method of any of clauses 1-9, wherein updating the first virtual shopping cart based on the interactions comprises adding a first item to the first virtual shopping cart when a first interaction between the first user and the first item comprises retrieval of the first item from a first shelf in the store; and removing a second item from the first virtual shopping cart when a second interaction between the first user and the second item comprises placing the second item onto a second shelf in the store.

11. The method of any of clauses 1-10, wherein updating the first virtual shopping cart with the set of items in the store comprises analyzing a third set of images by a set of shelf cameras in the store to detect the interactions between the first user and the set of items.

12. The method of any of clauses 1-11, further comprising tracking the first location of the first user in the store based on appearances of the first user in a second set of images collected by the set of tracking cameras.

13. In some embodiments, a non-transitory computer readable medium stores instructions that, when executed by a processor, cause the processor to perform the steps of detecting a first user in a store based on analysis of a first set of images collected by a set of tracking cameras in the store; creating a first virtual shopping cart for the first user without requiring the first user to establish an identity with the store; updating the first virtual shopping cart with a set of items in the store based on observations from a set of sensors of interactions between the first user and the set of items; and automatically performing at least one check-out operation related to the set of items in the first virtual shopping cart upon detecting that a first location of the first user is within proximity of a checkout location in the store.

14. The non-transitory computer readable medium of clause 13, wherein automatically performing at least one check-out operation comprises outputting a receipt for a purchase of the set of items in the first virtual shopping cart.

15. The non-transitory computer readable medium of any of clauses 13-14, wherein the steps further comprise when a second location of a second user is within a threshold distance to the first location of the first user for a pre-specified period, merging a second virtual shopping cart for the second user into the first virtual shopping cart; and omitting the at least one check-out operation for a third user when a third virtual shopping cart of the third user is empty.

16. The non-transitory computer readable medium of any of clauses 13-15, wherein automatically performing at least one check-out operation comprises initiating a review of an item in the first virtual shopping cart by at least one of the first user and a human reviewer.

17. The non-transitory computer readable medium of any of clauses 13-16, wherein the review of the item by the human reviewer is triggered based on at least one of a low confidence in an item in the first virtual shopping cart and input from the first user for disputing the item in the first virtual shopping cart.

18. The non-transitory computer readable medium of any of clauses 13-17, wherein creating the first virtual shopping cart for the first user comprises generating a descriptor for the first user from crops of the first user in the first set of images; assigning a unique identifier (UID) to the descriptor; and associating the first virtual shopping cart with the UID.

19. The non-transitory computer readable medium of any of clauses 13-18, wherein the interactions comprise an action performed by a hand of the first user with respect to an item to which the action is applied.

20. In some embodiments, a system comprises a memory that stores instructions, and a processor that is coupled to the memory and, when executing the instructions, is configured to detect a first user in a store based on analysis of a first set of images collected by a set of tracking cameras in the store; create a first virtual shopping cart for the first user without requiring the first user to establish an identity with the store; update the first virtual shopping cart with a set of items in the store based on observations from a set of sensors of interactions between the first user and the set of items; and automatically perform at least one check-out operation related to the set of items in the first virtual shopping cart upon detecting that a first location of the first user is within proximity of a checkout location in the store.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
   detecting a first user in a store based on analysis of a first set of images collected by a set of tracking cameras in the store;
   creating a first virtual shopping cart for the first user without requiring the first user to establish an identity with the store;
   updating the first virtual shopping cart with a set of items in the store based on observations from a set of sensors of interactions between the first user and the set of items;
   when a second location of a second user is within a threshold distance to the first location of the first user for a pre-specified period, merging a second virtual shopping cart for the second user into the first virtual shopping cart; and
   automatically performing at least one check-out operation related to the set of items in the first virtual shopping cart upon detecting that a first location of the first user is within proximity of a checkout location in the store.

2. The method of claim 1, wherein automatically performing at least one check-out operation comprises outputting a receipt for a purchase of the set of items in the first virtual shopping cart.

3. The method of claim 1, wherein automatically performing at least one check-out operation comprises receiving payment from the first user for the set of items at a checkout terminal at the checkout location.

4. The method of claim 3, wherein the payment is received via at least one of a mobile application on an electronic device and a payment card scanned at a checkout terminal at the checkout location.

5. The method of claim 1, wherein automatically performing at least one check-out operation comprises initiating a review of an item in the first virtual shopping cart by at least one of the first user and a human reviewer.

6. The method of claim 5, wherein the review of the item by the human reviewer is triggered based on at least one of a low confidence in an item in the first virtual shopping cart and input from the first user for disputing the item in the first virtual shopping cart.

7. The method of claim 1, wherein creating the first virtual shopping cart for the first user comprises:
   generating a descriptor for the first user from crops of the first user in the first set of images;
   assigning a unique identifier (UID) to the descriptor; and
   associating the first virtual shopping cart with the UID.

8. The method of claim 1, wherein the interactions comprise an action performed by a hand of the first user with respect to an item to which the action is applied.

9. The method of claim 1, wherein updating the first virtual shopping cart based on the interactions comprises:
   adding a first item to the first virtual shopping cart when a first interaction between the first user and the first item comprises retrieval of the first item from a first shelf in the store; and
   removing a second item from the first virtual shopping cart when a second interaction between the first user and the second item comprises placing the second item onto a second shelf in the store.

10. The method of claim 1, wherein updating the first virtual shopping cart with the set of items in the store comprises analyzing a third set of images by a set of shelf cameras in the store to detect the interactions between the first user and the set of items.

11. The method of claim 1, further comprising tracking the first location of the first user in the store based on appearances of the first user in a second set of images collected by the set of tracking cameras.

12. The method of claim 1, wherein detecting the first user in the store comprises:
   generating one or more crops of the first user in the first set of images;
   applying an embedding to the one or more crops to generate a descriptor that is a fixed-length vector representing an appearance of the first user in the first set of images; and
   determining that the descriptor does not match one or more descriptors for one or more other users in the store.

13. A non-transitory computer readable medium storing instructions that, when executed by a processor, cause the processor to perform the steps of:
   detecting a first user in a store based on analysis of a first set of images collected by a set of tracking cameras in the store;
   creating a first virtual shopping cart for the first user without requiring the first user to establish an identity with the store;
   updating the first virtual shopping cart with a set of items in the store based on observations from a set of sensors of interactions between the first user and the set of items;
   when a second location of a second user is within a threshold distance to the first location of the first user for a pre-specified period, merging a second virtual shopping cart for the second user into the first virtual shopping cart; and
   automatically performing at least one check-out operation related to the set of items in the first virtual shopping cart upon detecting that a first location of the first user is within proximity of a checkout location in the store.

14. The non-transitory computer readable medium of claim 13, wherein automatically performing at least one check-out operation comprises outputting a receipt for a purchase of the set of items in the first virtual shopping cart.

15. The non-transitory computer readable medium of claim 14, wherein the steps further comprise: virtual shopping cart for the second user into the first virtual shopping cart;

omitting the at least one check-out operation for a third user when a third virtual shopping cart of the third user is empty.

16. The non-transitory computer readable medium of claim 13, wherein automatically performing at least one check-out operation comprises initiating a review of an item in the first virtual shopping cart by at least one of the first user and a human reviewer.

17. The non-transitory computer readable medium of claim 16, wherein the review of the item by the human reviewer is triggered based on at least one of a low confidence in an item in the first virtual shopping cart and input from the first user for disputing the item in the first virtual shopping cart.

18. The non-transitory computer readable medium of claim 13, wherein creating the first virtual shopping cart for the first user comprises:

generating a descriptor for the first user from crops of the first user in the first set of images;

assigning a unique identifier (UID) to the descriptor; and associating the first virtual shopping cart with the UID.

19. The non-transitory computer readable medium of claim 13, wherein the interactions comprise an action performed by a hand of the first user with respect to an item to which the action is applied.

20. A system, comprising:

a memory that stores instructions, and a processor that is coupled to the memory and, when executing the instructions, is configured to:

detect a first user in a store based on analysis of a first set of images collected by a set of tracking cameras in the store;

create a first virtual shopping cart for the first user without requiring the first user to establish an identity with the store;

update the first virtual shopping cart with a set of items in the store based on observations from a set of sensors of interactions between the first user and the set of items;

when a second location of a second user is within a threshold distance to the first location of the first user for a pre-specified period, merge a second virtual shopping cart for the second user into the first virtual shopping cart; and automatically perform at least one check-out operation related to the set of items in the first virtual shopping cart upon detecting that a first location of the first user is within proximity of a checkout location in the store.

* * * * *

UNITED STATES PATENT AND TRADEMARK OFFICE
CERTIFICATE OF CORRECTION

PATENT NO. : 11,049,170 B1
APPLICATION NO. : 16/820671
DATED : June 29, 2021
INVENTOR(S) : Tony Francis and Ryan Patrick Brigden It is certified that error appears in the above-identified patent and that said Letters Patent is hereby corrected as shown below:

In the Claims

Column 19, Claim 15, Lines 4-6, please delete "virtual shopping cart for the second user into the first virtual shopping cart;".

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*